(12) United States Patent
Egolf et al.

(10) Patent No.: US 11,624,558 B2
(45) Date of Patent: Apr. 11, 2023

(54) TUBULAR MEMBRANE HEAT EXCHANGER

(71) Applicant: Baltimore Aircoil Company, Inc., Jessup, MD (US)

(72) Inventors: Kevin Ellsworth Egolf, Hampstead, MD (US); Yohann Lilian Rousselet, Boston, MA (US)

(73) Assignee: Baltimore Aircoil Company, Inc., Jessup, MD (US)

( * ) Notice: Subject to any disclaimer, the term of this patent is extended or adjusted under 35 U.S.C. 154(b) by 0 days.

(21) Appl. No.: 16/891,598

(22) Filed: Jun. 3, 2020

(65) Prior Publication Data

US 2020/0386481 A1 Dec. 10, 2020

Related U.S. Application Data

(60) Provisional application No. 62/857,113, filed on Jun. 4, 2019.

(51) Int. Cl.
| | |
|---|---|
| *B01D 69/10* | (2006.01) |
| *F16L 41/08* | (2006.01) |
| *F28F 9/02* | (2006.01) |
| *F28D 7/00* | (2006.01) |
| *F28F 9/16* | (2006.01) |

(52) U.S. Cl.
CPC ............ *F28D 7/0066* (2013.01); *B01D 69/10* (2013.01); *B01D 2313/23* (2013.01); *F16L 41/082* (2013.01); *F28F 9/0256* (2013.01); *F28F 9/162* (2013.01); *F28F 9/167* (2013.01)

(58) Field of Classification Search
CPC .......... F28F 9/0256; F28F 9/162; F28F 9/167; F16L 41/082; B01D 69/10; B01D 2313/23
See application file for complete search history.

(56) References Cited

U.S. PATENT DOCUMENTS

| | | | | |
|---|---|---|---|---|
| 3,480,147 A | * | 11/1969 | Kanyok ............... | B01D 63/063 210/321.87 |
| 3,494,470 A | * | 2/1970 | Bandfield ............ | B01D 63/065 210/321.89 |
| 3,697,635 A | * | 10/1972 | Dietzsch ............... | B01D 69/08 29/527.1 |

(Continued)

FOREIGN PATENT DOCUMENTS

| | | | | |
|---|---|---|---|---|
| EP | 2208956 A2 | * | 7/2010 | ............ F28F 21/062 |
| GB | 1601429 A | * | 10/1981 | ........... B29C 65/483 |
| KR | 10-1630448 B1 | | 6/2016 | |

OTHER PUBLICATIONS

Translation of EP2208956A2 entitled Translation-EP2208956A2 (Year: 2010).*

(Continued)

*Primary Examiner* — Paul Alvare
(74) *Attorney, Agent, or Firm* — Fitch, Even, Tabin & Flannery LLP

(57) ABSTRACT

In one aspect, a tubular membrane assembly is provided for a heat exchanger. The tubular membrane assembly includes a header having a header body, a tubular membrane, and a fitting connecting the tubular membrane to the header body. The fitting is configured to form a fluid tight connection between the fitting and the tubular membrane. The tubular membrane assembly further includes potting of the header keeping the tubular membrane connected to the fitting.

23 Claims, 10 Drawing Sheets

(56) References Cited

U.S. PATENT DOCUMENTS

| | | | | |
|---|---|---|---|---|
| 3,707,234 | A | * | 12/1972 | Salemi .................. B01D 61/08 210/321.87 |
| 3,926,813 | A | * | 12/1975 | de Putter ............... B01D 63/06 210/321.9 |
| 4,117,884 | A | * | 10/1978 | Frei ....................... F28F 21/006 165/178 |
| 4,295,522 | A | * | 10/1981 | Frei ........................ B23P 15/26 165/158 |
| 4,321,911 | A | | 3/1982 | Offutt |
| 4,461,707 | A | * | 7/1984 | Thayer ................ B01D 63/063 210/450 |
| 4,897,359 | A | | 1/1990 | Oakley |
| 4,902,419 | A | * | 2/1990 | Shibata ................ B01D 63/061 264/261 |
| 5,058,661 | A | * | 10/1991 | Oshiyama ............. B01D 63/02 165/905 |
| 5,104,535 | A | | 4/1992 | Cote |
| 5,192,478 | A | * | 3/1993 | Caskey ................ B01D 63/022 264/254 |
| 5,401,406 | A | * | 3/1995 | Johnson ................ B01D 29/66 210/450 |
| 5,467,818 | A | | 11/1995 | Buckley, Jr. |
| 5,540,278 | A | | 7/1996 | Chiba |
| 6,038,768 | A | | 3/2000 | Rhodes |
| 6,126,819 | A | * | 10/2000 | Heine .................... B01D 65/08 210/321.89 |
| 6,142,219 | A | | 11/2000 | Korenic |
| 6,487,768 | B2 | | 12/2002 | Rhodes |
| 7,160,463 | B2 | * | 1/2007 | Beck .................... B01D 63/021 210/321.78 |
| 7,468,281 | B2 | * | 12/2008 | Kallury ............... B01L 3/50853 436/178 |
| 9,061,251 | B2 | | 6/2015 | Hobbs |
| 9,234,665 | B2 | | 1/2016 | Erb |
| 9,533,261 | B2 | * | 1/2017 | Teo ..................... B29C 45/1671 |
| 9,630,147 | B2 | | 4/2017 | Collignon |
| 9,810,439 | B2 | | 11/2017 | Coutu |
| 10,302,317 | B2 | | 5/2019 | Erb |
| 10,352,628 | B2 | | 7/2019 | Erb |
| 10,712,024 | B2 | | 7/2020 | Lepoudre |
| 10,928,082 | B2 | | 2/2021 | Coutu |
| 11,092,349 | B2 | | 8/2021 | Lepoudre |
| 11,143,430 | B2 | | 10/2021 | Ghadiri Moghaddam |
| 2008/0000629 | A1 | | 1/2008 | Viczena |
| 2008/0152893 | A1 | * | 6/2008 | Stroh ................... B01D 71/024 264/603 |
| 2010/0170776 | A1 | | 7/2010 | Ehrenberg |
| 2011/0283720 | A1 | | 11/2011 | Martin |
| 2013/0206658 | A1 | | 8/2013 | Wu |
| 2013/0319569 | A1 | | 12/2013 | Kikuno |
| 2015/0122715 | A1 | | 5/2015 | Collignon |
| 2015/0233588 | A1 | | 8/2015 | Betts |
| 2015/0233589 | A1 | * | 8/2015 | Betts .................... B01D 53/263 202/180 |
| 2015/0300757 | A1 | | 10/2015 | Yang |
| 2016/0046498 | A1 | * | 2/2016 | Caton .................... C01C 3/022 423/375 |
| 2016/0341498 | A1 | | 11/2016 | Lynn |
| 2020/0295386 | A1 | * | 9/2020 | Eickhoff ................ B01D 69/08 |
| 2020/0353417 | A1 | | 11/2020 | Bahar |
| 2021/0060493 | A1 | | 3/2021 | Bahar |
| 2021/0276231 | A1 | | 9/2021 | Sato |
| 2021/0332993 | A1 | | 10/2021 | Coutu |
| 2021/0396422 | A1 | | 12/2021 | Ghadiri Moghaddam |
| 2022/0003437 | A1 | | 1/2022 | Lepoudre |

OTHER PUBLICATIONS

International Search Report and Written Opinion from corresponding PCT Application No. PCT/US2020/035914 dated Aug. 14, 2020; 11 pages.

Article: Haier extends nanotech cooling deal from https://www.coolingpost.com/world-news/haier-extends-nanotech-cooling-deal/; Sep. 9, 2018; 2 pages.

Finalist Profile of Kraton Corporation, IIT Bombay, Porus Laboriatories and Infosys from https://globalcoolingprize.org/kraton-iitbombay-porus-and-infosys/; Nov. 15, 2019; 3 pages.

Norteck Air Solutions, LLC; product brochure for StatePoint™ Liquid Cooling Data Center Technology; publicly available before Jun. 4, 2019; 2 pages.

PolyCool Introduction 2018 video from https://www.youtube.com/watch?v=DPULpwa_pfA&feature=emb_logo; published May 28, 2018; 11 pages.

Suez Water Technologies & Solutions; ZeeWeed Ultrafiltration product guide from https://www.suezwatertechnologies.com/products/zeeweed-ultrafiltration; publicly available before Jun. 4, 2019; 3 pages.

Abdel-Salam, Mohamed R.H., et al., State-of-the-Art in Liquid-to-Air Membrane Energy Exchangers (LAMEEs): A Comprehensive Review; Renewable and Sustainable Energy Reviews, 2014. 39: p. 700-728.

Ali, Mohamed, et al., Humidification Technique Using New Modified MiniModule Membrane Contactors for Air Cooling. Advances in Mechanical Engineering, 2013. 5: p. 174016.

Bakeri, G. et al.; A Porous Polyethersulfone Hollow Fiber Membrane in a Gas Humidification Process; RSC Advances, 2015; 5(19): p. 14448-14457.

Bazhenov, Stepan D., et al.; Gas-Liquid Hollow Fiber Membrane Contactors for Different Applications. Fibers, 2018. 6(4): p. 76.

Charles, Nicholas T. et al.; The Occurrence and Characterization of Fouling During Membrane Evaporative Cooling; Journal of Membrane Science, 2008. 319(1): p. 44-53.

Chen, Dongmei, et al.; An Experimental Study and Model Validation of a Membrane Humidifier for PEM Fuel Cell Humidification Control; Journal of Power Sources, 2008. 180(1): p. 461-467.

Chen, Xiangjie, et al., Experimental Investigations of Polymer Hollow Fibre Integrated Evaporative Cooling System with the Fibre Bundles in a Spindle Shape; Energy and Buildings, 2017. 154: p. 166-174.

Chiari A.; Air Humidification with Membrane Contactors: Experimental and Theoretical Results; International Journal of Ambient Energy, 2000; 21(4): p. 187-195.

Cui, Xin, et al., Performance Analysis of a Hollow Fiber Membrane-Based Heat and Mass Exchanger for Evaporative Cooling; Applied Energy, 2020. 271: p. 115238.

Englart, S., An Experimental Study of the Air Humidification Process Using a Membrane Contactor; E3S Web Conf., 2017. 17: p. 00021.

Johnson, D.W., et al.; Analysis of Heat and Mass Transfer Phenomena in Hollow Fiber Membranes used for Evaporative Cooling; Journal of Membrane Science, 2003. 227(1): p. 159-171.

Khayet, M., et al.; Modeling and Optimization of Sweeping Gas Membrane Distillation; Desalination, 2012. 287: p. 159-166.

Khayet, M., et al.; Theoretical and Experimental Studies on Desalination Using the Sweeping Gas Membrane Distillation Method; Desalination, 2003. 157(1): p. 297-305.

Khayet, Mohamed, et al.; Nature of Flow on Sweeping Gas Membrane Distillation; Journal of Membrane Science, 2000. 170(2): p. 243-255.

Khayet, Mohamed, et al.; Theory and Experiments on Sweeping Gas Membrane Distillation; Journal of Membrane Science, 2000. 165(2): p. 261-272.

Kulaç, Hande; Experimental and Theoretical Aspects of Membrane Based Water Cooling System, in Department of Chemical Engineering; 2017, Middle East Technical University: Ankara, Turkey; 149 pages.

Loeb, Sidney; Membrane Evaporative Cooling to 30 Degrees C or Less: 1. Membrane Evaporative Cooling of Contained Water. Ann N Y Acad Sci, 2003. 984: p. 515-27.

Mansourizadeh, A., et al.; Hollow Fiber Gas—Liquid Membrane Contactors for Acid Gas Capture: A Review; Journal of Hazardous Materials, 2009. 171(1): p. 38-53.

Metz, Sybrandus Jacob; Water Vapor and Gas Transport Through Polymeric Membranes; University of Twente, Enschede, The Netherlands; 2003; 143 pages.

(56) References Cited

OTHER PUBLICATIONS

Pandey, Ramendra, et al.; Modelling of Water-to-Gas Hollow Fiber Membrane Humidifier; Chemical Engineering Science, 2018. 192: p. 955-971.

Park, Se-Kyu, et al.; Characteristics of Membrane Humidifiers for Polymer Electrolyte Membrane Fuel Cells; Korean Journal of Chemical Engineering, 2005. 22(6): p. 877-881.

Qu, Ming, et al., Isothermal Membrane-Based Air Dehumidification: A Comprehensive Review; Renewable and Sustainable Energy Reviews, 2018. 82: p. 4060-4069.

Ramya, K., et al.; Study of a Porous Membrane Humidification Method in Polymer Electrolyte Fuel Cells; International Journal of Hydrogen Energy, 2011. 36(22): p. 14866-14872.

Said, Ibrahim A., et al., Sweeping Gas Membrane Distillation (SGMD) for Wastewater Treatment, Concentration, and Desalination: A Comprehensive Review; Chemical Engineering and Processing—Process Intensification, 2020. 153: p. 107960.

Smith, Benjamin D.; Sweeping Gas Membrane Evaporative Cooling for the Enhanced Performance of Vapour Compression Refrigeration; in Department of Chemical and Biological Engineering; 2010, University of Ottawa, Canada; 111 pages.

Xu, Y., et al., A Review on Polymer-Based Membranes for Gas-Liquid Membrane Contacting Processes: Current Challenges and Future Direction; Separation and Purification Technology, 2019; 229: p. 115791.

Yang, Minlin, et al.; Experimental Investigations of a Quasi-Counter Flow Parallel-Plate Membrane Contactor Used for Air Humidification; Energy and Buildings, 2014. 80: p. 640-644.

Zhang, Li-Zhi, et al.; Coupled Heat and Mass Transfer in a Counter Flow Hollow Fiber Membrane Module for Air Humidification; International Journal of Heat and Mass Transfer, 2011. 54(5): p. 1055-1063.

Zhao, Shuaifei, et al., Condensation Studies in Membrane Evaporation and Sweeping Gas Membrane Distillation; Journal of Membrane Science, 2014. 462: p. 9-16.

Zhao, Shuaifei, et al., Condensation, Re-Evaporation and Associated Heat Transfer in Membrane Evaporation and Sweeping Gas Membrane Distillation; Journal of Membrane Science, 2015. 475: p. 445-454.

3M™ Liqui-Cel™ product overview printed from Internet Archive Wayback Machine https://www.3m.com/3M/en_US/liquicel-us/; publicly available before Jun. 4, 2019; 3 pages.

Cobetter Filtration Equipment Co., Ltd; Arrayforce™ Membrane Contactor product overview from https://www.cobetterfiltration.com/Industries/General-Industry/Water-Treatment/Condensate-Polishing/products/Arrayforce-Membrane-Contactor.html; publicly available before Jun. 4, 2019; 3 pages.

PermSelect® Silicone Gas Exchange Membranes; Air/Gas Humidification overview printed from Internet Archive Wayback Machine http://permselect.com/markets/gas%20humidification; publicly available before Jun. 4, 2019; 1 page.

Breakthrough from the National Labs: "Desiccant Enhanced Evaporative Air Conditioning" video from https://www.youtube.com/watch?v=_3TEkCqw-64, posted Apr. 25, 2012; screen captures with transcribed audio, 10 pages.

Energy-efficient graphene-based membrane cooling systems of Evercloak, Inc.; Canadian government investment in energy innovation from https://www.nrcan.gc.ca/science-and-data/funding-partnerships/funding-opportunities/current-investments/energy-efficient-graphene-based-membrane-cooling-systems/22631; Mar. 19, 2021; 4 pages.

Hollow Fiber Membrane Manufacturing Systems brochure from MEMS website https://www.membranefilter.co.kr/hfm-system, believed to be publicly available Sep. 2021; 5 pages.

Hollow Fibre Series overview from PCI Membranes website https://www.pcimembranes.com/products/pci-hollow-fibre-series/), believed to be publicly available Sep. 2021; 4 pages.

Kraton Corporation: NexarCool™ Technology video from https://www.youtube.com/watch?v=KNISA8m0oOU, posted Jan. 3, 2020; screen captures (no dialogue); 12 pages.

Labban, Omar et al.; Next-generation HVAC: Prospects for an limitations of desiccant and membrane-based dehumidification and cooling; Applied Energy 200 (2017) 330-346.

Membrane Filtration overview from Koch Separation Solutions website https://www.kochseparation.com/technologies/membrane-filtration/, believed to be publicly available Sep. 2021; 7 pages.

Nortek™ StatePoint overview from Nortek Air Solutions LLC website https://www.nortekair.com/product/statepoint/, publicly available before Dec. 3, 2020; 3 pages.

Portacool Jetstream Series product overview from Portacool Evaporative Coolers website https://portacool.com/jetstream-evap-coolers/; publicly available before Dec. 3, 2020; 3 pages.

Products page from PCI Membranes website https://www.pcimembranes.com/products/, believed to be publicly available Sep. 2021; 8 pages.

StatePoint® Indirect Cooling Technology brochure from https://www.nortekair.com/wp-content/uploads/2019/12/184F-1019-Nortek-StatePoint-Brochure.pdf; publicly available before Dec. 3, 2020; 12 pages.

The Membrane overview from Blue Foot Membranes website https://www.bluefootmembranes.com/the-membrane/, believed to be publicly available Sep. 2021; 2 pages.

Tubular UF Membrane Modules brochure from Berghof Membranes website https://www.berghofmembranes.com/tubular-uf-membrane-modules/, believed to be publicly available Sep. 2021; 7 pages.

U.S. Appl. No. 17/541,741, filed Dec. 3, 2021 entitled Tubular Membrane Heat Exchanger; 116 pages.

U.S. Appl. No. 63/287,586, filed Dec. 9, 2021 entitled Tubular Membrane Heat Exchanger; 101 pages.

Woods, Jason; Membrane processes for heating, ventilation, and air conditioning; Renewable and Sustainable Energy Reviews 33 (2014) 290-304.

X-Flow Tubular Membranes overview from Pentair website https://xflow.pentair.com/en/spectrum/membrane-technology-in-general/tubular-membranes, believed to be publicly available Sep. 2021; 1 page.

Extended European Search Report from related European Patent Application No. 20819588.3 dated Jan. 4, 2023; 7 pages.

* cited by examiner

TUBULAR MEMBRANE HEAT EXCHANGER

CROSS-REFERENCE TO RELATED APPLICATION

This application claims the benefit of U.S. Provisional Patent Application No. 62/857,113, filed Jun. 4, 2019, which is hereby incorporated herein in its entirety.

FIELD

This disclosure relates to heat exchangers and, more specifically, to heat exchangers having tubular membranes that facilitate heat transfer between two fluids.

BACKGROUND

Heat exchangers (HX) come in a wide variety of configurations and are used in a wide variety of applications. In one approach, referred to as tubular membrane HX, tubes are inserted in tube sheets and sealed to the tube sheet using a number of methods including welding, rolling, braising and gluing (for plastic tubular membrane HX). Another approach involves potting all of the tubes at once with a tube sheet rather than gluing tubes one by one. In yet another approach, tubes together are bundled and compressed mechanically to seal the assembly.

Sealing membrane tubes can be a challenge due to the small size and large number of tubes. Further, potting a membrane tube in a tube sheet can be a challenge due to poor adhesion of the potting to the tube. Additionally, with inconsistent and/or flexible tubes, uneven gaps between tubes and tube sheets can create leaks.

Additionally, water flow rates for tubular membrane HX may be limited by sealant issues resulting in lowering the heat and mass transfer properties for the tubular membrane HX. Membrane tube-to-tube sheet seal strength, not tube and tube sheet strength, may be the limiting factor in working pressure of the heat and mass exchangers for these types of applications which in turn limits the versatility and applicability of the tubular membrane HX.

DETAILED DESCRIPTION

In one aspect, a tubular membrane assembly is provided for a heat exchanger. The tubular membrane assembly includes a header having a header body, a tubular membrane, and a fitting connecting the tubular membrane to the header body. The fitting is configured to form a fluid tight connection between the fitting and the tubular membrane. The tubular membrane assembly further includes potting of the header keeping the tubular membrane connected to the fitting. The tubular membrane assembly provides a secure connection between the header body and the tubular membrane, which may be flexible and relatively small in cross-section, and facilitates the use of fluid pressures in excess of 5 pounds per square inch (psi), such as in the range of approximately 10 psi to approximately 20 psi, or greater than 20 psi such as approximately 50 psi or greater. The durability provided by the tubular membrane assembly permits a heat exchanger to be provided with variable spacing between the tubular membranes of the heat exchanger. Variable spacing between tubular membranes facilitates the configuration of the heat exchanger to be optimized for a particular application.

In another aspect of the present disclosure, a heat exchanger is provided that includes at least one tubular membrane heat exchanger and a fan assembly operable to generate airflow relative to the at least one tubular membrane heat exchanger. The heat exchanger further includes a pump operable to pump fluid. The at least one tubular membrane heat exchanger is configured to receive the fluid and includes an inlet header, an outlet header, a plurality of tubular membranes, and fittings coupling the tubular membranes to the inlet and outlet headers. In one embodiment, the tubular membranes each have a side wall extending about a lumen of the tubular membrane. The tubular membranes provide a high ratio of effective heat and mass transfer surface area per heat and mass exchanger unit volume to provide efficient heat transfer between a fluid in the lumens of the tubular membranes and a fluid outside of the tubular membranes.

In one embodiment, the side walls of the tubular membranes are made of a material that is gas-permeable and liquid-impermeable. For example, the fluid may include a mixture of water and water vapor and the side walls of the tubular membrane permit water vapor to permeate out of the tubular membranes. The removal of the higher-energy water vapor reduces the temperature of the fluid flow in the tubular membranes. Further, the airflow generated by the fan assembly removes the water vapor from outer surfaces of the tubular membranes.

In one embodiment, the at least one tubular membrane heat exchanger may be removable from the heat exchanger to facilitate assembly of the heat exchanger as well as permit repair or replacement of the tubular membrane heat exchanger assembly.

Figure 1:
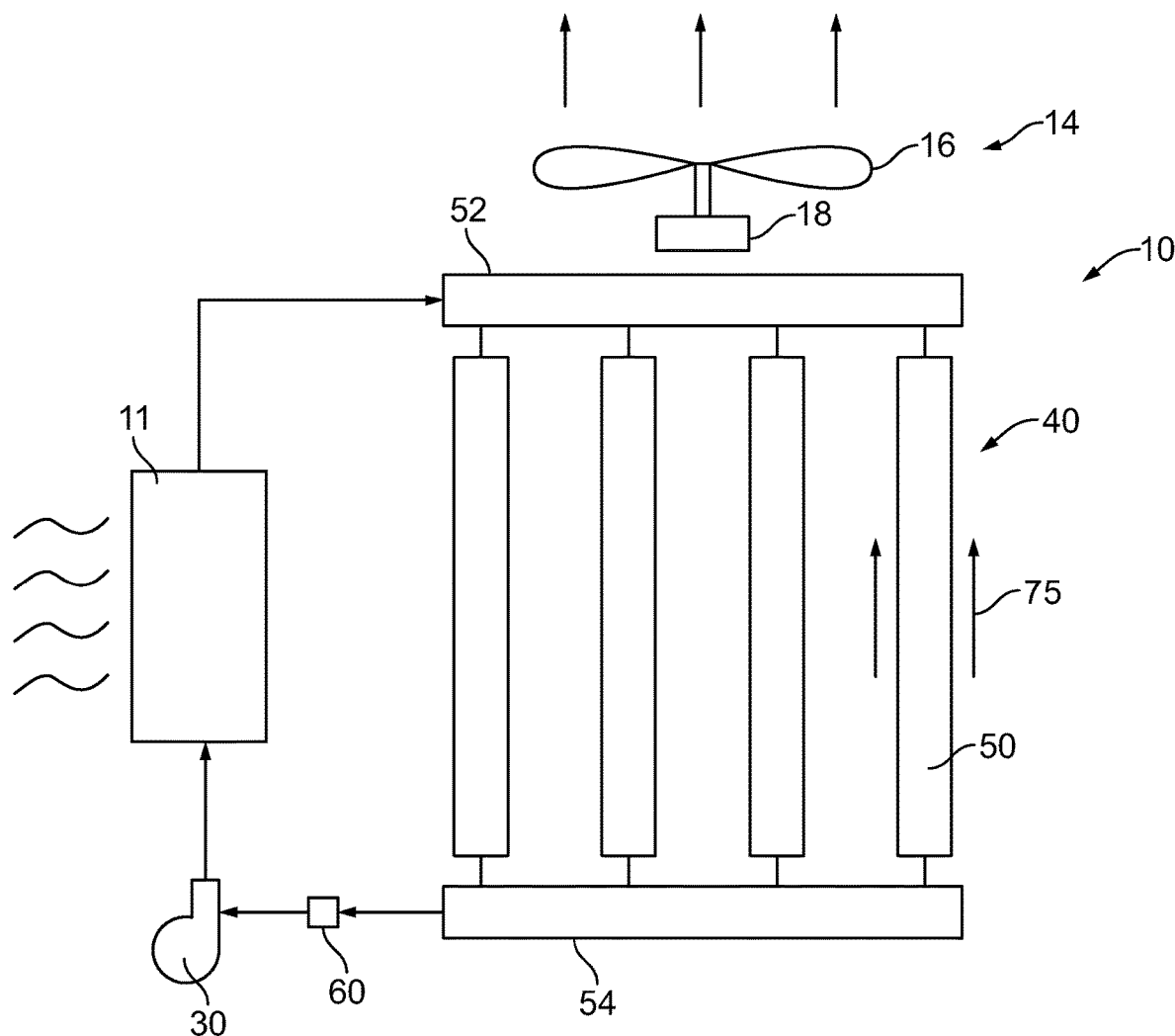
FIG. 1 is a schematic view of a heat exchanger system including tubular membrane heat exchanger assemblies.

Regarding FIG. 1, a heat exchanger system 10 is provided that includes a heat exchanger 11 that receives heat, such as heat from inside of a building, and transfers the heat to a fluid such as water or a water/glycol mixture. The fluid may include liquid and gas, the proportions of which may vary as the working fluid travels throughout the heat exchanger system 10. The heat exchanger system 10 includes a pump 12 configured to pump the fluid from the heat exchanger 11 to a heat exchanger 40. The heat exchanger 40 includes one or more heat exchanger cassettes, such as tubular membrane heat exchangers 50. The tubular membrane heat exchanger 50 are releasably or permanently connected to an inlet manifold 52 and an outlet manifold 54. In another approach, the heat exchanger 40 may receive heat and transfer the heat to the fluid, while the heat exchanger 11 removes heat from the fluid.

Figure 2:
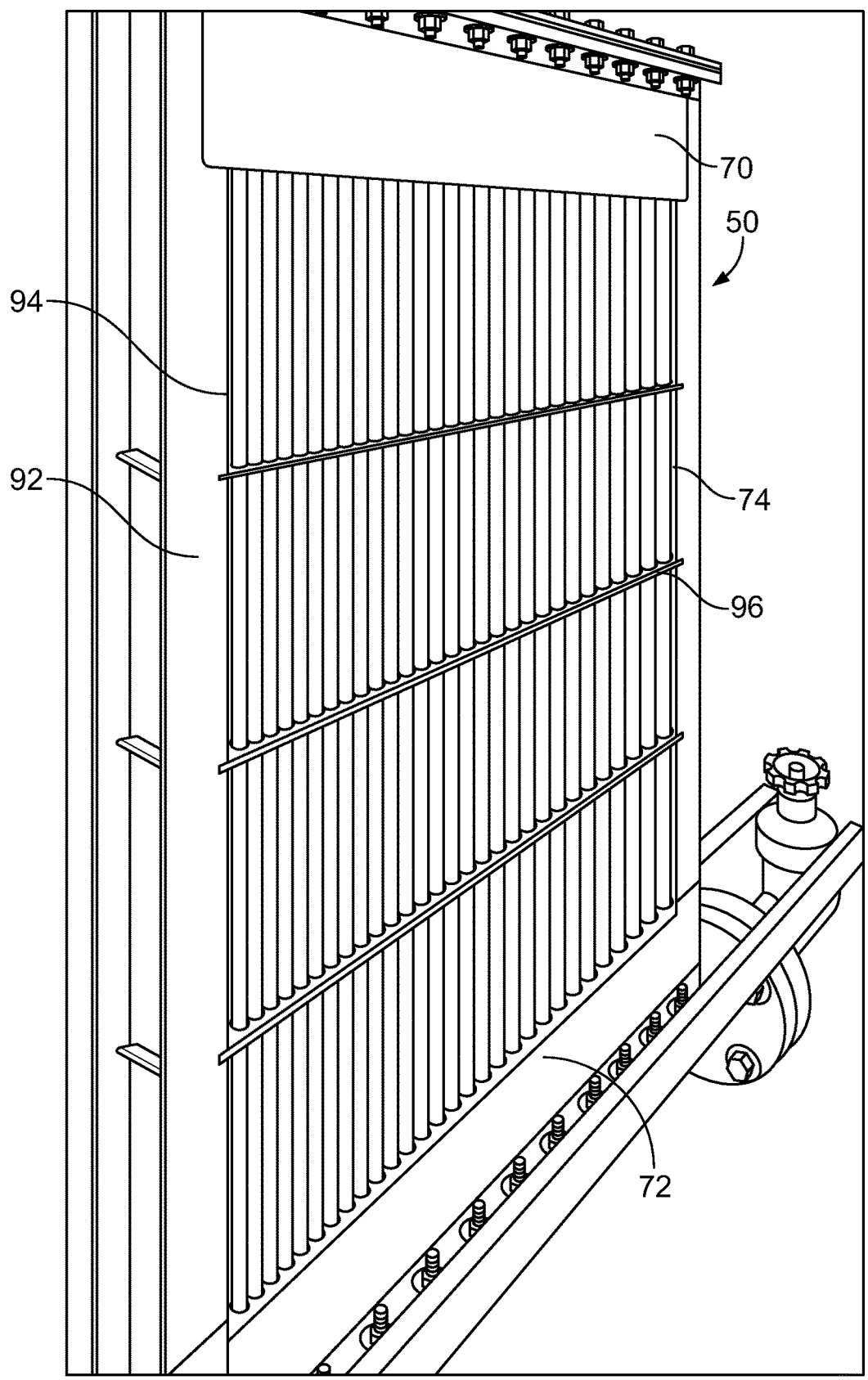
FIG. 2 is a perspective view of one of the tubular membrane heat exchanger assemblies of FIG. 1.

Regarding FIG. 2, each tubular membrane heat exchanger 50 includes an inlet header 70 that receives the fluid from the inlet manifold 52, one or more tubular membranes 74 through which the fluid travels, and an outlet header 72 that collects the fluid from the tubular membranes 74. The tubular membranes 74 facilitate heat and/or mass transfer between a first fluid within the tubular membranes 74 and a second fluid outside of the tubular membranes 74. As one example, the tubular membranes 74 may be made of a gas-permeable material that is also liquid-impermeable. The tubular membranes 74 receive fluid including a mixture of liquid and gas that has been heated by the heat exchanger 11. The tubular membranes 74 permit the gas, such as vapor, that has been heated by the heat exchanger 11 to travel out of the tubular membranes 74. As an example, the fluid entering the tubular membranes 74 may be a mixture of water and water vapor. In another approach, the fluid may be completely gas upon reaching the tubular membranes 74 and may exit the outlet header 72 as a liquid or a gas/liquid mixture.

The tubular membranes 74 may be made of, for example, one or more polymers such as polypropylene (PP), polydimethylsiloxane (PDMS) or polytetrafluoroethylene (PTFE). The tubular membranes 74 may be porous and include openings in the nanometer diameter range to facilitate heat and/or mass transfer. The tubular membranes 74 may be flexible and relatively flimsy which makes gripping the tubular membranes 74 difficult to secure to another component. For example, the tubular membranes 74 may be stiff enough to be placed vertically on a surface and retain their shape, but any external pressure makes the tubular membranes 74 bend and/or twist.

Regarding FIG. 1, the heat exchanger system 10 includes a fan assembly 14 having one or more fans 16 and one or more motors 18. The fan assembly 14 is configured to generate airflow relative to the tubular membranes 74, such as in direction 75 along the lengths of the tubular membranes 74, and/or in directions transverse to the lengths of the tubular membranes 74. The airflow may assist in removing the gas from outer surfaces 91 (see FIG. 3) of the tubular membranes 74. The fluid may be water, as mentioned above, and pure water vapor may permeate through the tubular membranes 74 while contaminants such as debris, scale, and organisms remain inside of the tubular membranes 74. Further, the tubular membranes 74 inhibit exterior contaminants from entering the tubular membranes 74.

Regarding FIGS. 1 and 2, the outlet header 72 of each tubular membrane assembly 50 directs the fluid to the outlet manifold 54. The heat exchanger system 10 includes a pump 30 configured to pump the fluid from the outlet manifold 54 to the heat exchanger 11 and throughout the heat exchanger system 10. The pump 30 may generate a gauge pressure of the fluid at the inlet header 70 in the range of approximately zero pounds per square inch (psi) to approximately 50 psi such as 5 psi or higher, 10 psi or higher, or 15 psi or higher, 20 psi or higher, 30 psi or higher, or 40 psi or higher. The heat exchanger system 10 may further include a fluid supply 60 that adds fluid, such as liquid, gas, or a liquid/gas mixture, to the system 10 to compensate for the gas permeating out of the tubular membranes 74.

Figure 3:
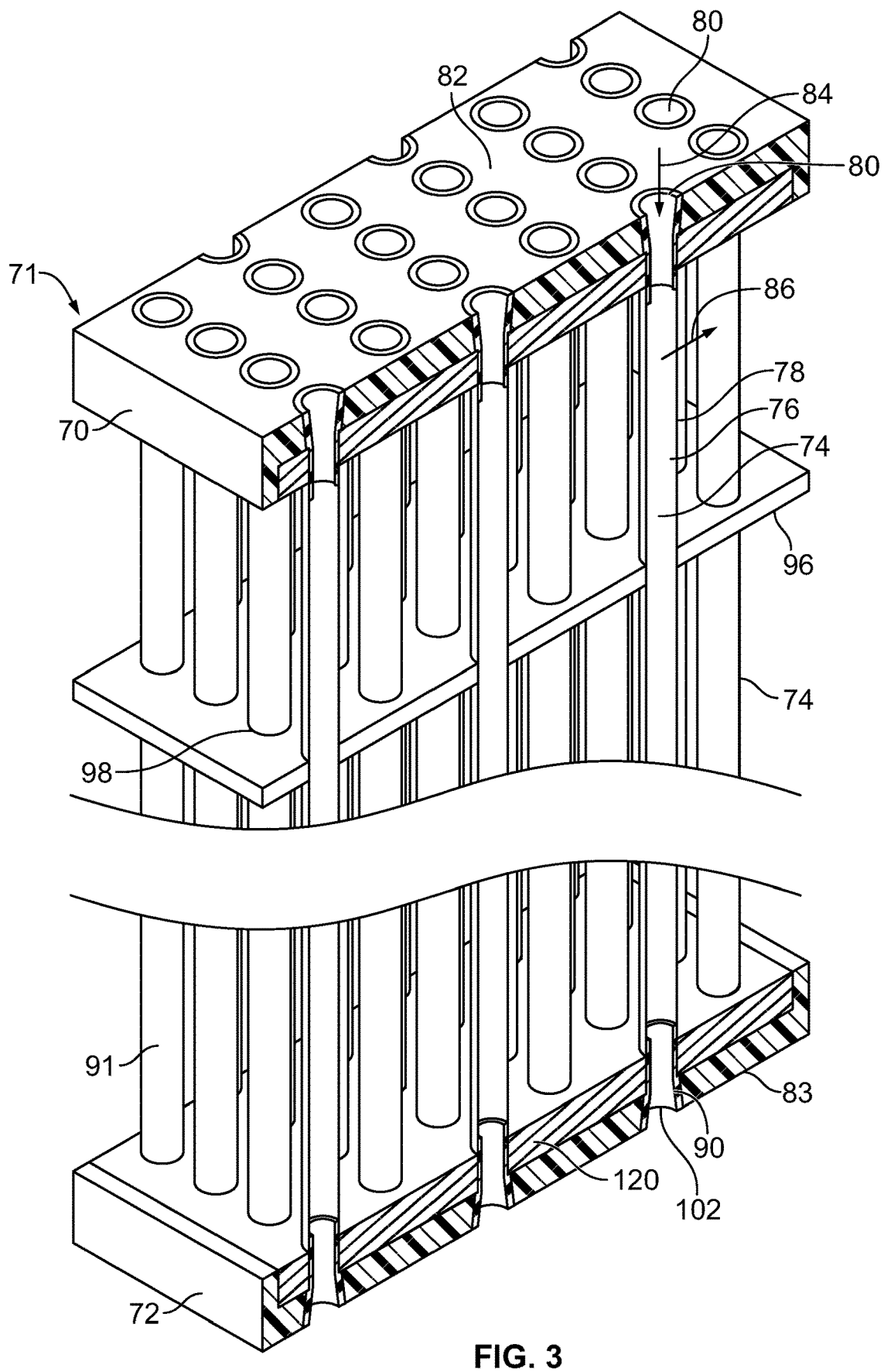
FIG. 3 is a cross-sectional view of a portion of the tubular membrane heat exchanger assembly of FIG. 2 showing tubular membranes, header bodies, fittings connecting the tubular membranes to the headers, and a spacer plate separating the tubular membranes.

Regarding FIG. 3, the tubular membranes 74 may each include an internal passageway, such as a lumen 76, and a side wall 78 extending thereabout. The lumen 76 may have an inner diameter in the range of approximately 0.1 inches to approximately 0.5 inches, such as 0.25 inches or 0.125 inches. The side wall 78 may have a thickness in the range of 1 micron to approximately 200 microns, such as approximately 1 micron to approximately 5 microns, such as approximately 5 microns to approximately 10 microns, such as approximately 10 microns to approximately 15 microns, such as approximately 15 microns to approximately 50 microns, such as approximately 30 microns, such as approximately 50 microns to approximately 75 microns, such as approximately 150 microns to approximately 200 microns. As further examples, the tubular membranes 74 may have an inner diameter less than 5 millimeters (mm), approximately 5 mm, or greater than 5 mm.

The tubular membranes 74 may be flexible and the tubular membrane heat exchanger 50 may include a support for each of the tubular membranes 74 that resists lateral movement, bending and ballooning of the tubular membrane 74. The support may extend a majority of, such as greater than 50%, 60%, 70%, 80%, 90% or substantially the entire length of the tubular membrane 74. In one embodiment, the support may include a braided sleeve surrounding the tubular membrane 74 and extending substantially the entire length of the tubular membrane 74. The braided sleeve may be made of a woven plastic or metal material that inhibits bending of the tubular membrane 74. An example braided sleeve 174 is discussed below with respect to FIG. 9. Other embodiments of the supports may include rods or other elongate guides. Yet other embodiments of the supports may include coils about the tubular membranes 74.

Regarding FIG. 3, the inlet header 70 has a header body 71 including a plate portion 82 with openings 80. The fluid in the heat exchanger system 10 may travel through the openings 80 in the plate portion 82 of the inlet header 70 generally in direction 84 and into the lumen 76 of the tubular membrane 74. The side wall 78 of the tubular membrane 74 permits gas of the fluid, such as water vapor in a fluid including water vapor and water, to permeate outward through the side wall 78 roughly in direction 86 and into contact with the air flow generated by the fan assembly 14. The liquid of the flow, such as the water, travels through the lumen 76 of the tubular membrane 74 and into the outlet header 72 via openings 90 in a plate portion 83 of the outlet header 72.

Regarding FIG. 2, the tubular membrane heat exchanger 50 have a modular configuration that permits the tubular membrane heat exchanger 50 to be individually connected to and removed from the heat exchanger system 40. The module nature of the tubular membrane heat exchanger 50 also permits the capacity of the direct heat exchanger 40 to be adjusted by adding or removing tubular membrane heat exchangers 50 and making associated changes to the volume of fluid in the system 10, capacity of the heat exchanger 11, and/or flow rate of the pump 30 as appropriate.

The tubular membrane heat exchanger 50 may include a frame 92 supporting the inlet and outlet headers 70, 72, the tubular membranes 74, and the spacers 96. The frame 92 has an opening 94 that permits air flow along and between the tubular membranes 74 to facilitate dissipation of the heated gas that has permeated through the side walls 76 of the tubular membranes 76. Regarding FIG. 3, the spacers 96 include openings 98 that receive the tubular membranes 74. The spacers 96 resist lateral shifting and bending of the tubular membranes 74 upon the tubular membranes 74 receiving pressurized fluid. The spacers 96 may also keep the tubular membranes 74 in a generally straight, parallel orientation while the tubular membranes are potted, as discussed below, which facilitates production of a gap-free connection between the potting material and the tubular membranes 74. The number and thickness of the spacers 96 may be selected so that the spacers 96 operate as supports in lieu of the sleeves 174.

Figure 4:
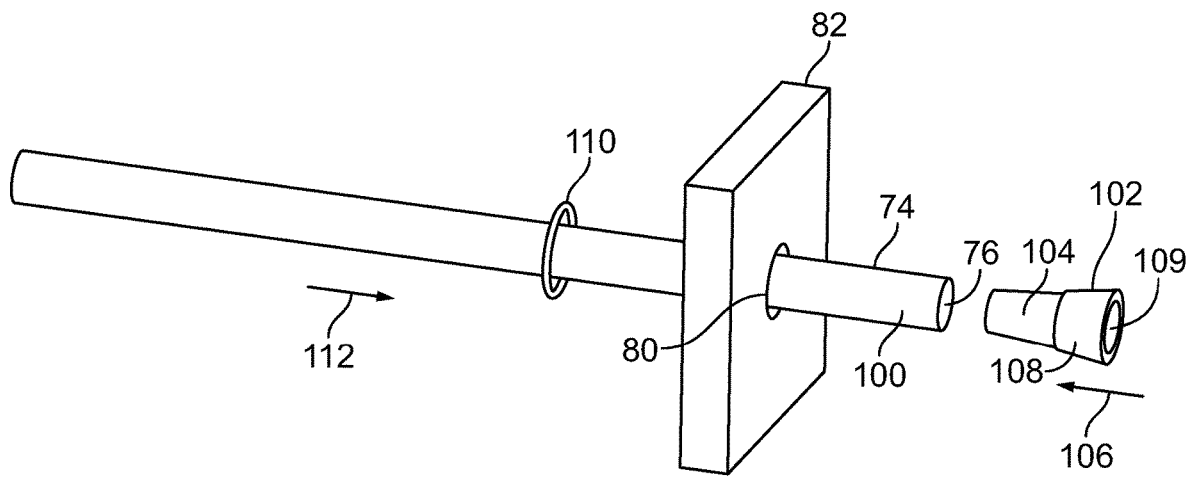
FIG. 4 is an exploded, perspective view of an end portion of one of the tubular membranes of FIG. 3 showing the tubular membrane, a fitting, a rubber band that connects the tubular membrane to the header body.

Regarding FIG. 4, the tubular membrane 74 has an end portion 100 that is connected to the plate portion 82 of the inlet header 70 via a connector, such as a fitting 102. The tubular membrane 74 is connected to the plate portion 83 of the outlet header 72 via a similar fitting 102. The fitting 102 has a nipple portion 104, a base portion 108, and a through opening that permits fluid flow through the fitting.

To assemble the tubular membrane 74 with the header plate portion 82, the nipple portion 104 is advanced in direction 106 into the lumen 76 of the tubular membrane 74. The assembled tubular membrane 74 and fitting 102 are shifted in direction 106 to seat the base portion 108 of the fitting 102 in the opening 80 of the plate portion 82. A retainer, such as a rubber band 110, may be secured to the end portion 100 of the tubular membrane 74 to keep the end portion 100 secured to the nipple portion 104 of the fitting 102. For example, the rubber band 110 may be shifted in direction 112 along the tubular membrane 74 until reaching the end portion 100. The rubber band 110 applies a compressive force on the tubular membrane 74 that holds the tubular membrane 74 tightly against the nipple portion 104 of the fitting 102. In another embodiment, the retainer may include a zip tie or a spring-biased mechanical clamp as some examples. Other examples of the retainer may include a gasket, an expanding-foam material, glue, or a combination thereof.

Figure 5:
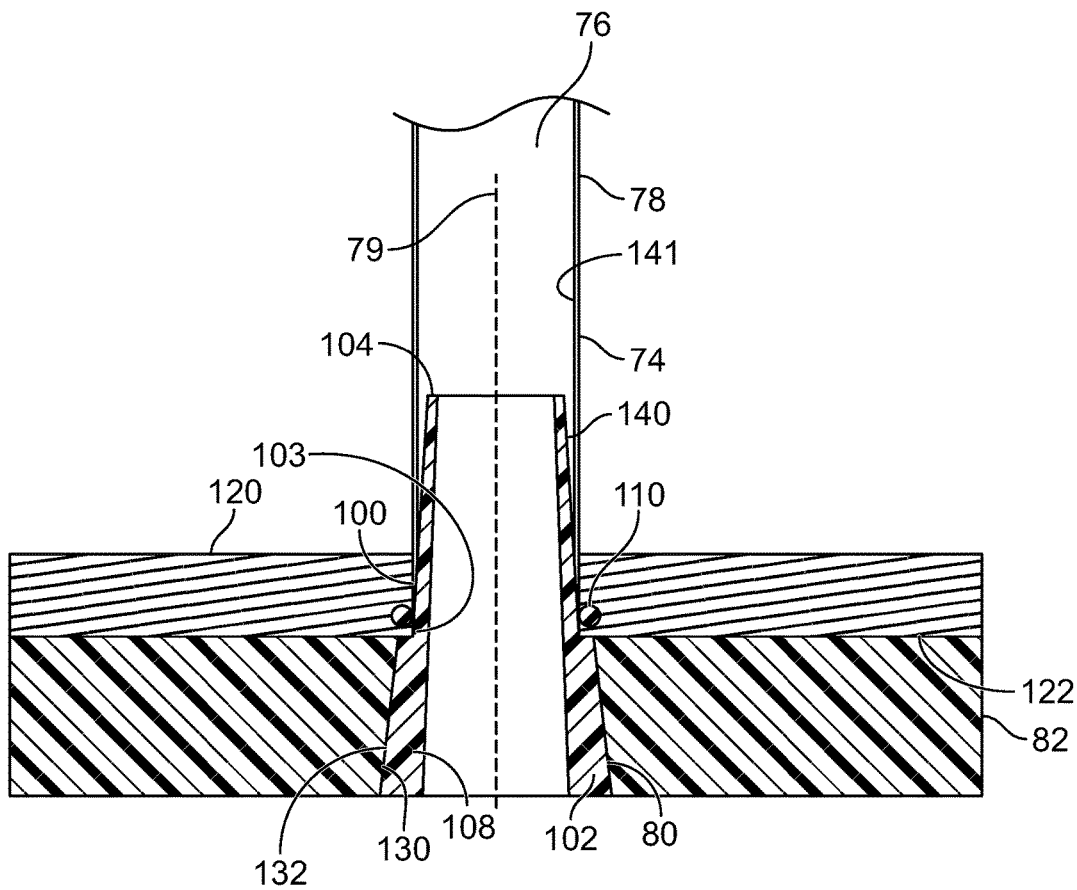
FIG. 5 is a cross-sectional view of a tubular membrane assembly including one of the tubular membranes of FIG. 3 showing potting embedding an end portion of the tubular membrane, the rubber band, and an outer surface of the header body.

Regarding FIG. 5, the tubular membrane 74, fitting 102, and rubber band 110 have been assembled to the plate portion 82. The inlet header 70 includes potting 120 that has been applied to a surface 122 of the header plate portion 82. The potting 120 may include an epoxy potting or an ultraviolet-curable silicone potting as some examples. The potting 120 embeds the end portion 100 of the tubular membrane 74 and the rubber band 110 within the potting 120 and forms a mechanical bond between the components. In some embodiments, the potting 120 forms a chemical bond with the tubular membrane 74 to further resist movement of the tubular membrane 74 relative to the potting 120.

The nipple portion 104 forms an interference fit with an inner surface 141 of the side wall 78 of the tubular membrane 74 to form a fluid-tight seal. The fitting 102 has a central axis 79 and may have a varying width taken transverse to the longitudinal axis 79 to facilitate sealing of the tubular membrane 74 and mechanical locking of the fitting 102 to the plate portion 82. In one example, the nipple portion 104 has a frustoconical outer surface 140 sized to permit the nipple portion 104 to be advanced at least partially into the lumen 76 of the tubular membrane 74 and form a fluid tight seal with the inner surface 141 of the side wall 78 of the tubular membrane 74. The fitting base portion 108 has a frustoconical surface 130 that mates with a corresponding frustoconical surface 132 of the opening 80 of the plate portion 82. The surfaces 130, 132 form a friction fit that inhibits the potting material 120 from seeping between the plate portion 82 and the fitting 102 before the potting 120 has cured. The mating engagement between surfaces 130, 132 also inhibits pull-though of the fitting 102 upon pressurization of the fluid in the system 10.

The potting 120 maintains the seal between the tubular membrane 74 and the fitting 102. As one example, the potting 120 may chemically bond with the material of the tubular membrane 74 and, once cured, inhibits movement of the tubular membrane 74. The potting 120 may also chemically bond with the bodies 82 of the inlet and outlet headers 70, 72 such as in embodiments wherein the bodies 82 are made of a polymer. In another embodiment, the potting 120 may not chemically bond with the tubular membrane 74 but the presence of the cured potting inhibits movement and/or expansion of the portion of the tubular membrane 74 engaged with the nipple portion 104 of the fitting 102. By maintaining the seal between the tubular membrane 74 and the fitting 102, the potting 120 keeps fluid from seeping between an end 103 of the tubular membrane 74 and the nipple portion 104 and expanding the end 103 due to contact with the fluid. In some embodiments, the material of the tubular membrane 74 expands when contacted by the fluid such that the contact of the potting 120 against the tubular membrane 74 keeps the tubular membrane 74 sealed to the nipple portion 104 upstream of the end 103 so the end 103 stays free of fluid and secured to the fitting 102. The potting 120 thereby keeps fluid within the lumen 76 of the tubular membrane 74 and away from the end 103 of the tubular membrane 74.

Figure 6:
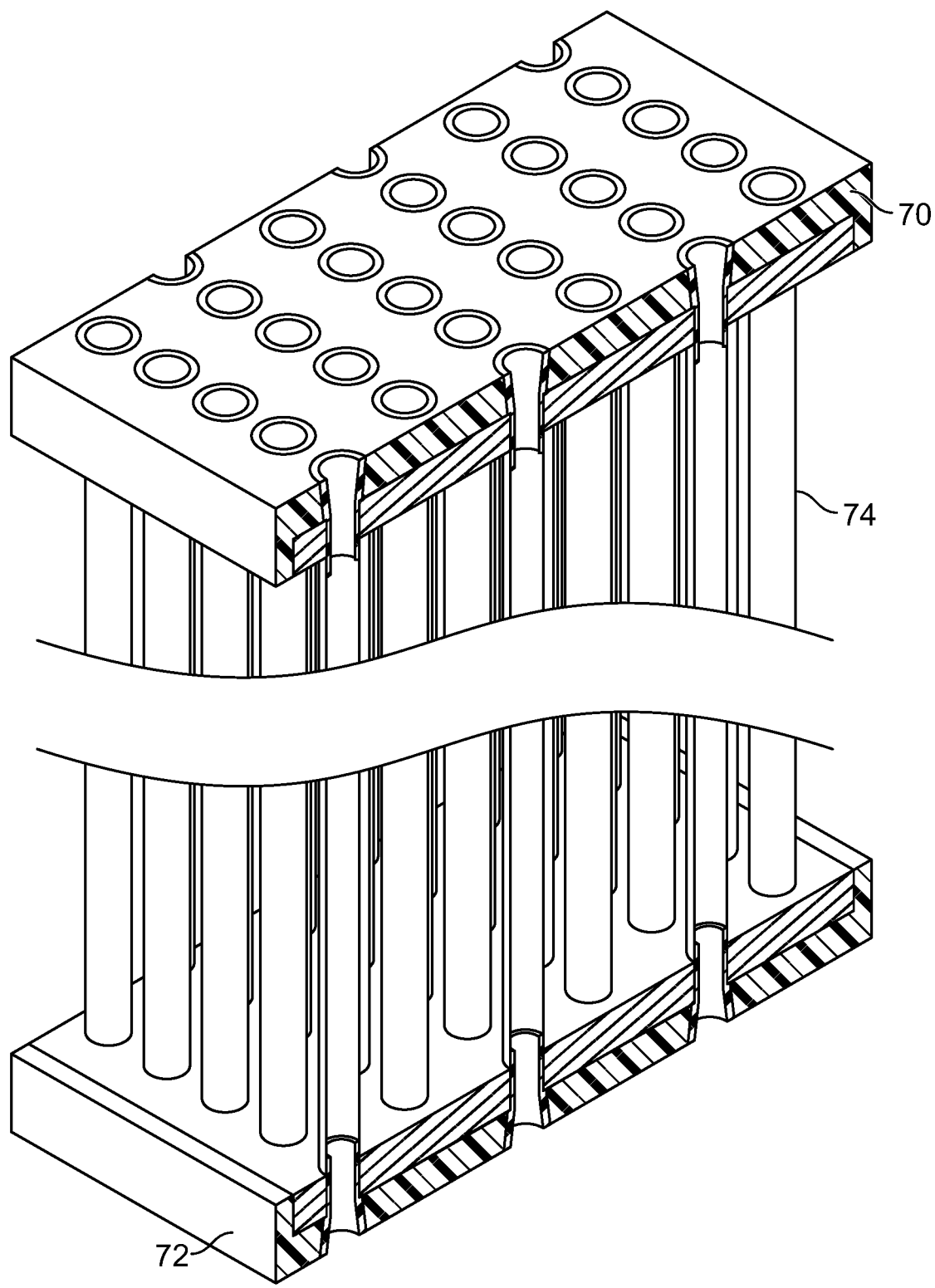
FIG. 6 is a cross-sectional view of another tubular membrane heat exchanger assembly without a spacer plate to separate the tubular membranes.

Regarding FIG. 6, in some embodiments, the tubular membrane heat exchanger assembly 50 may be provided without the spacers 96. In this form, the tubular membranes 74 extend from the inlet header 70 to the outlet header 72 without the spacers 96.

Figure 7:
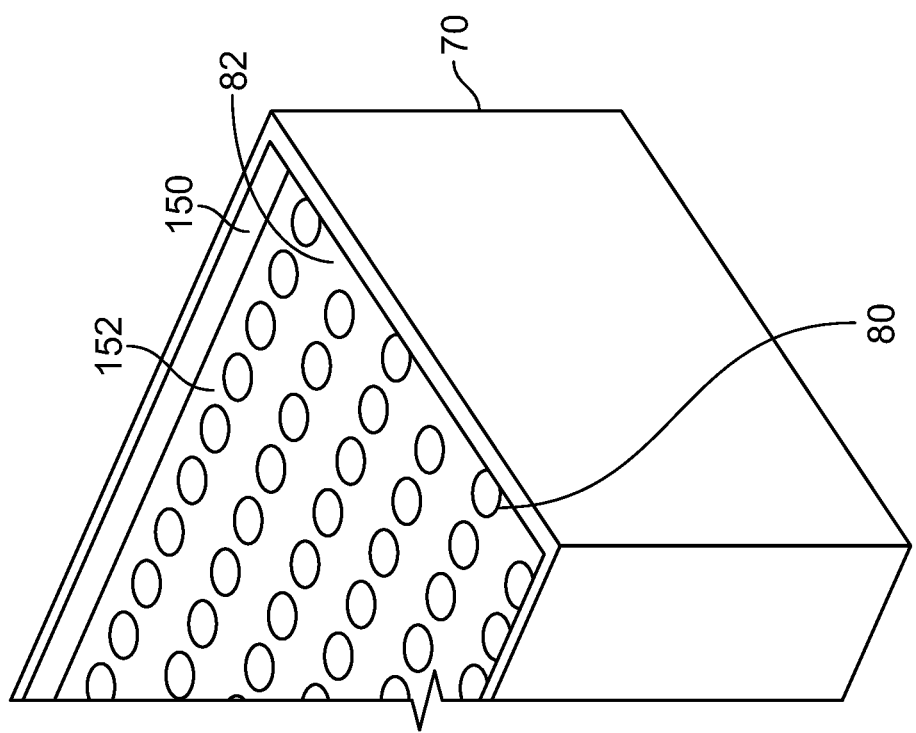
FIG. 7 is a perspective view of a header showing a plate portion of the header, openings in the plate portion for receiving tubular membranes, and a curb extending about the plate portion to retain liquid potting when the liquid potting is poured onto the header.

Regarding FIG. 7, the inlet header 70 is shown without the tubular membranes 74 attached. Although the following discussion refers to the inlet header 70, the outlet header 72 may have a similar construction. The inlet header 70 includes a curb 150 upstanding from the periphery of the plate portion 82. The curb 150 and plate portion 82 form a recess 152 for receiving liquid potting material and keeping the liquid potting material in contact with the tubular membranes 74 until the potting material has cured and solidified.

Figure 8:
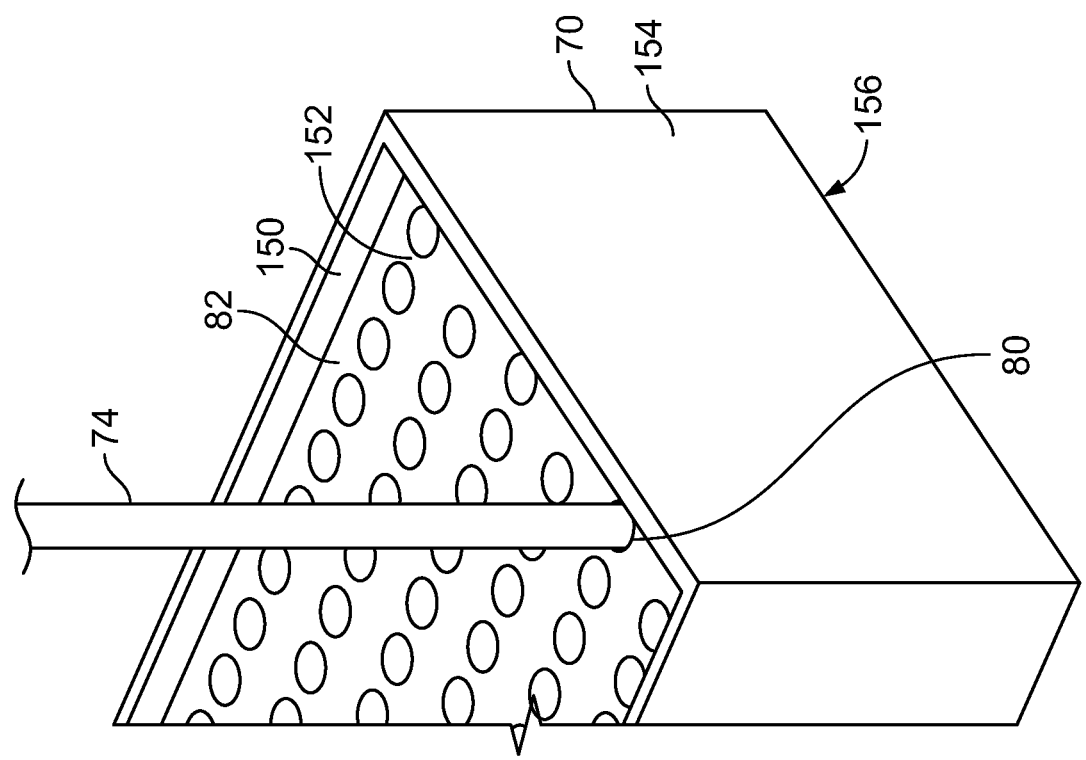
FIG. 8 is a view similar to FIG. 7 showing a tubular membrane having been advanced into one of the openings of the header plate portion.

Regarding FIG. 8, a tubular membrane 74 is shown advanced into one of the openings 80 of the plate portion 82. The inlet header 70 includes one or more side wall portions 154 that extend in an opposite direction from the curb 150 and form an interior compartment of the inlet header 70. The interior compartment 156 may be a volume that receives the fluid which the inlet header 70 then directs into the tubular membranes 74.

In some embodiments, the headers 70, 72 and fittings 102 are made of the same or different metallic and/or polymer-based materials. The tubular membrane heat exchanger 50 may have one or more components made by additive or subtractive manufacturing approaches, such as 3D printing or milling. As further examples, one or more components of the tubular membrane heat exchanger 50 may be molded.

Figure 9:
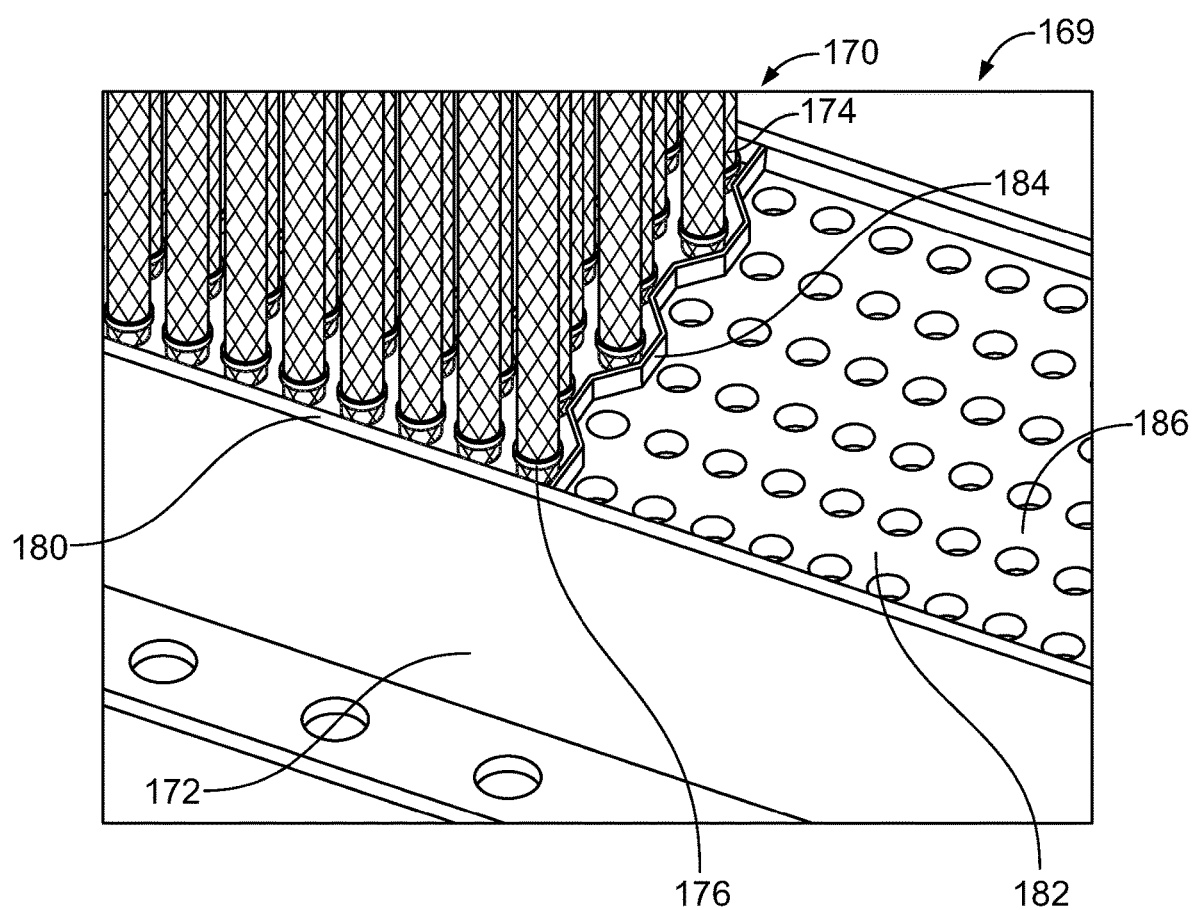
FIG. 9 is a perspective view of a header showing tubular membranes inserted into openings of a plate portion of the header before potting has been applied to the header.

Regarding FIG. 9, a portion of another tubular membrane heat exchanger 169 is provided that includes tubular membranes 170 and a header 172. FIG. 9 shows the portion of the tubular membrane heat exchanger 169 before the potting material is applied to a plate portion 182 of the header 172.

The tubular membrane heat exchanger 169 includes sleeves 174 on the outside of and supporting the tubular membranes 170. The sleeves 174 may have a woven structure with openings that permit airflow through sleeves 174. In one example, the sleeves 174 include a metallic mesh that resists deformation of the tubular membranes 170 while having openings that permit airflow into contact with the tubular membranes 170 and removal of the permeated gas near the exterior of the tubular membranes 170.

The tubular membrane heat exchanger 169 includes rubber bands 176 securing the sleeves 174 and tubular membranes 170 therein to fittings that connect the tubular membranes 170 to the header 172. In one embodiment, the fittings resemble the fittings 102 discussed above. The header 172 includes a curb 180 extending around a periphery of the plate portion 182 of the header 172. The header 172 further includes a barrier wall 184 that separates a recess 186 of the header 172 into two halves. The barrier wall 184 permits one half of the recess 186 at a time to be filled with potting material. This may make manufacturing easier because the recess 186 to be filled with potting material with a sequence of pours of potting material.

Figure 10:
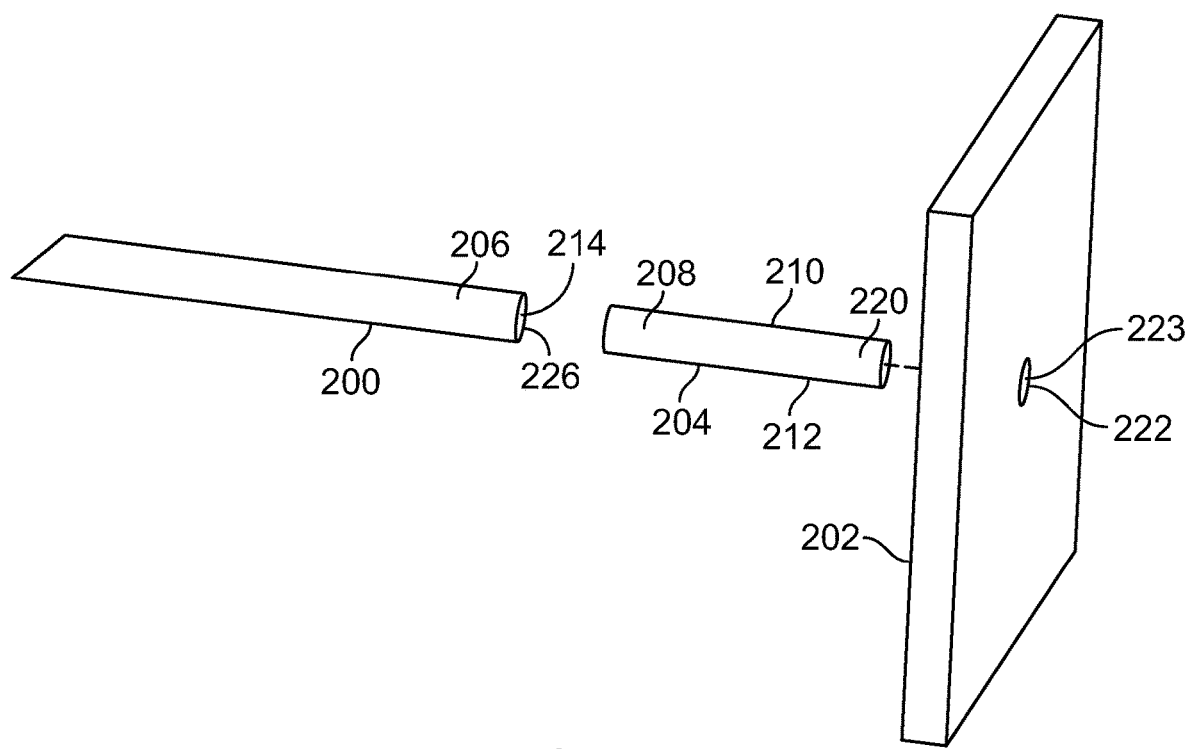
FIG. 10 is an exploded, perspective view of a tubular membrane, a fitting, and a plate portion of a header.

Regarding FIG. 10, a tubular membrane 200 is provided that connects to a header plate portion 202 via a fitting 204. In some embodiments, a sleeve may be provided around the tubular membrane 200 to support the tubular membrane 200 as discussed above with respect to FIG. 9. The fitting 204 has an end portion 208 that is sized to tightly fit into an end portion 206 of the tubular membrane 206. In one embodiment, the fitting 204 is a tube having an annular side wall 210 and a cylindrical outer surface 212 that engages a surface 223 of the opening 222. The cylindrical outer surface 212 has an outer diameter and the surface 223 has an inner diameter that are sized to form a tight fit between the fitting 204 and the plate portion 202 which inhibits liquid potting from seeping between the fitting 204 and the plate portion 202 when the potting is poured onto the plate portion 202. Further, the outer diameter of outer surface 212 may be within ±1% of an inner diameter of the tubular membrane 200. The tubular membrane 200 and fitting 204 may be configured to form a fluid-tight seal therebetween and the potting 120 reinforces the fluid-tight seal to resist pressurized fluid. In other embodiments, the tubular membrane 200 and fitting 204 may form a fluid-tight seal therebetween after the potting 120 has cured.

Figure 11:
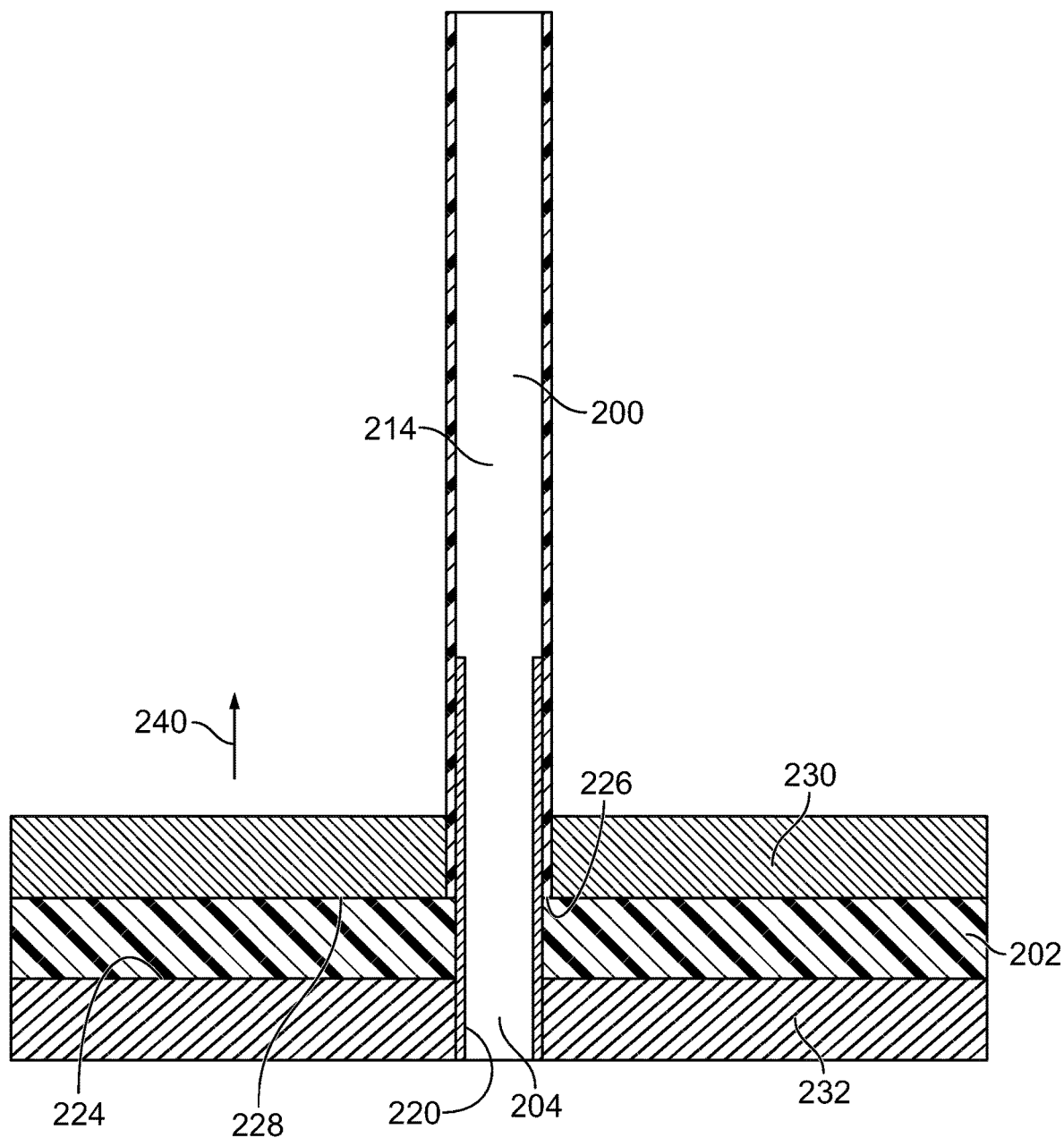
FIG. 11 is a cross-sectional view of the tubular membrane, fitting, and header plate portion of FIG. 10 assembled and having potting applied to opposite sides of the header plate portion.

With reference to FIGS. 10 and 11, the tubular membrane 200 is connected to the header plate portion 202 by advancing the end portion 208 of the fitting 204 into a lumen 214 of the tubular membrane 200. The fitting 204 may engage the tubular membrane 200 and form a fluid-tight connection therebetween. The connecting may further include advancing an opposite end portion 220 of the fitting 204 into an opening 222 of the header plate portion 202. The end portion 220 of the fitting 204 is advanced so that the end portion 220 protrudes outward from a surface 224 of the header plate portion 202. The tubular membrane 200 has an end 226 that is positioned against or near an opposite surface 228 of the header plate portion 202.

To maintain the seal between the tubular membrane 200 and fitting 204 upon the tubular membrane 200 receiving pressurized fluid, potting 230 is applied to the surface 228 of the header plate portion 202 and into contact with the tubular membrane 200. Potting 232 is also applied to the surface 224 of the header plate portion 202. The potting 232 connects to the end portion 220 of the fitting 204 to resist pull-through of the fitting 204 in direction 240. The potting 230, 232 may be made of the same or different potting materials. The potting 230, 232 may each have a depth in the range of 0.1 inches to 1 inch, such as approximately 0.25 inches or less. In one embodiment, the fitting 204 includes a thin-walled stainless steel tube.

Figure 12:
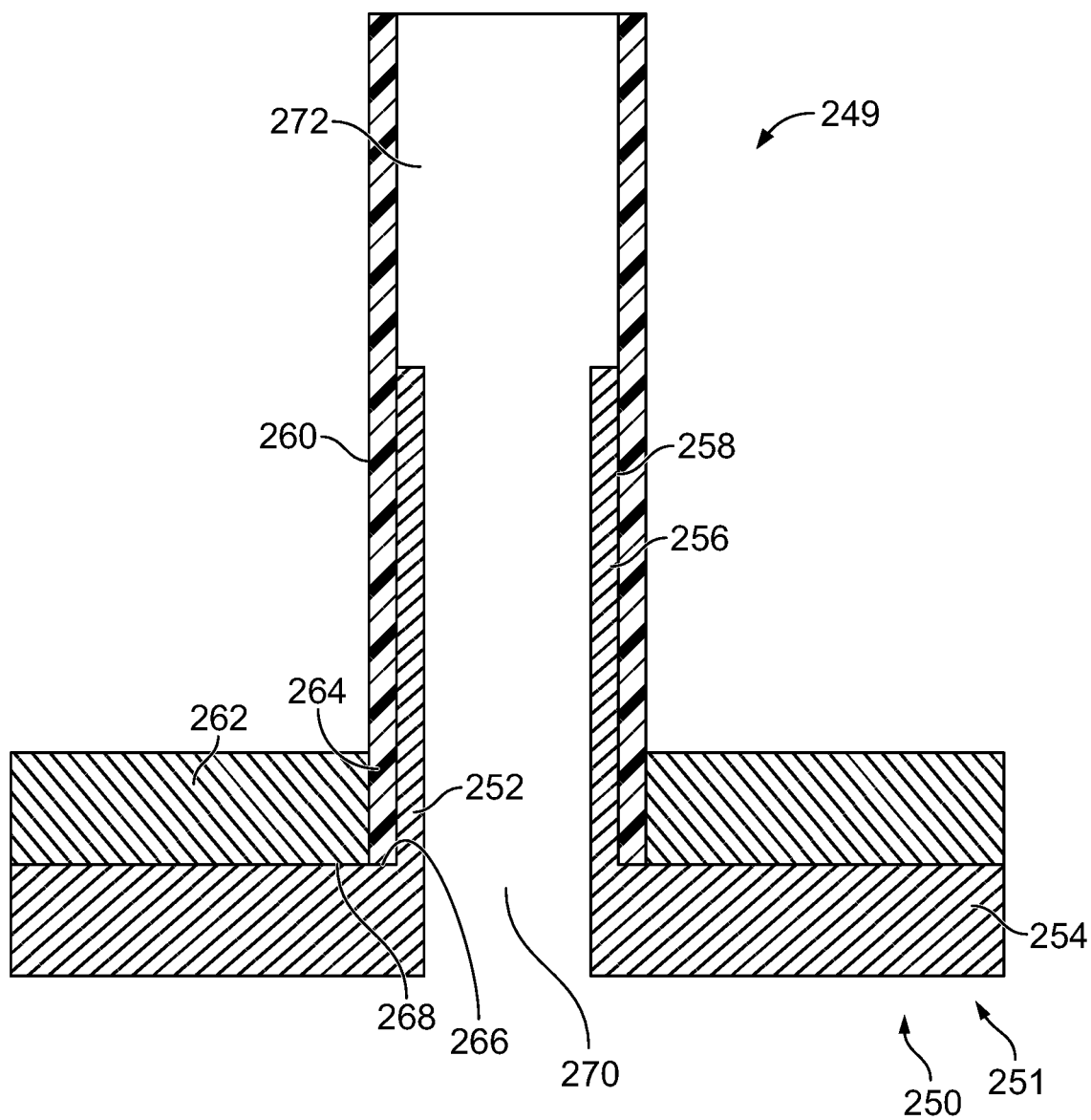
FIG. 12 is a cross-sectional view of a header having a unitary fitting and header body.

Regarding FIG. 12, a header 250 may be provided that includes a header body 251 including a fitting 252 and a header plate portion 254. The header body 251 has a unitary, one-piece construction and may be made of metallic or polymer materials. The fitting 252 may include a side wall 256 having a circular cross-section such that the side wall 256 has a cylindrical outer surface 258.

A tubular membrane 260 connects to the fitting 252 in a manner similar to the tubular membrane 200 being connected to the fitting 204 discussed above. The header 250 includes potting 262 that secures an end portion 264 of the tubular membrane 260 to the fitting 252. In one embodiment, the tubular membrane 260 has an end 266 that is contacting or near a surface 268 of the header plate portion 254. The fitting 252 has an opening 270 in communication with a lumen 272 of the tubular membrane 260 to permit fluid to travel between the tubular membrane 260 and the header 250.

The tubular membranes and fittings discussed above may have a circular cross-section in some embodiments. In other embodiments, the tubular membranes and fittings may have a variety of cross-sectional shapes including, but not limited to, obround, elliptical, teardrop, triangular, square, rectangular, or a combination thereof.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A tubular membrane assembly for a heat exchanger, the tubular membrane assembly comprising:
   a header to receive a fluid, the header including a header body having an opening;
   a tubular membrane having a lumen;
   a fitting in the opening of the header body and connecting the tubular membrane to the header body, the fitting configured to form a fluid tight connection between the fitting and the tubular membrane and permit fluid to flow between the header and the lumen of the tubular membrane;
   an inner surface portion of the header body;
   an outer surface portion of the header body opposite the inner surface portion of the header body;

the fitting protruding from the outer surface portion of the header body and the inner surface portion of the header body;

the tubular membrane having an end portion adjacent the outer surface portion of the header body;

a first potting of the header embedding the outer surface portion of the header body and the end portion of the tubular membrane to keep the tubular membrane connected to the fitting; and a second potting on the inner surface portion of the header body resisting outward movement of the fitting.

2. The tubular membrane assembly of claim 1 wherein the tubular membrane includes a side wall extending about the lumen;

wherein the fitting extends into the lumen and engages the side wall to form the fluid tight connection between the fitting and the tubular membrane; and wherein the first potting contacts the sidewall and keeps the tubular membrane connected to the fitting.

3. The tubular membrane assembly of claim 1 further comprising a retainer securing the tubular membrane to the fitting.

4. The tubular membrane assembly of claim 1, wherein the tubular membrane includes an inner surface defining at least a portion of the lumen of the tubular membrane and an outer surface opposite the inner surface;

wherein the fitting includes a first outer surface portion configured to engage the inner surface of the tubular membrane and form the fluid-tight connection between the tubular membrane and the fitting; and wherein the fitting includes a second outer surface portion configured to form a connection with the header body that inhibits liquid potting from seeping between the second outer surface portion and the header body.

5. The tubular membrane assembly of claim 1 wherein the tubular membrane includes a sidewall of a material that is gas-permeable and liquid impermeable.

6. The tubular membrane assembly of claim 1 wherein the header includes a curb extending about a periphery of the potting.

7. The tubular membrane assembly of claim 1 wherein the header body includes a plate portion including the inner and outer surface portions and the opening;

wherein the plate portion is sandwiched between the first potting and the second potting.

8. The tubular membrane assembly of claim 1 wherein the fitting has a length and a cross-section perpendicular to the length; and wherein the fitting has the same cross section for substantially the entire length of the fitting.

9. The tubular membrane assembly of claim 1 wherein the end portion of the tubular membrane contacts the outer surface portion of the header body.

10. The tubular membrane assembly of claim 1 wherein the fitting includes an annular side wall; and wherein the first potting is radially outward of the end portion of the tubular membrane.

11. The tubular membrane assembly of claim 1 wherein the inner surface portion and the outer surface portion extend parallel to one another.

12. A tubular membrane heat exchanger comprising:

an inlet header including an inlet header body having a plurality of inlet through openings and inlet header surface portions defining at least a portion of the inlet through openings;

an outlet header including an outlet header body having a plurality of outlet through openings and outlet header surface portions defining at least a portion of the outlet through openings;

a plurality of tubular membranes having lumens;

a plurality of inlet fittings extending in the inlet through openings of the inlet header body and connecting the tubular membranes to the inlet header body;

the inlet fittings having inlet fluid passageways to permit fluid to flow between the inlet header and the lumens of the tubular membranes;

the inlet fittings having inlet inner surface portions defining at least a portion of the inlet fluid passageways and inlet outer surface portions opposite the inlet inner surface portions;

the inlet outer surface portions of the inlet fittings contacting the inlet header surface portions of the inlet header body;

potting of the inlet header keeping the tubular membranes connected to the inlet fittings;

a plurality of outlet fittings extending in the outlet through openings of the outlet header body and connecting the tubular membranes to the outlet header body;

the outlet fittings having outlet fluid passageways to permit fluid flow between the lumens of the tubular membranes and the outlet header;

the outlet fittings having outlet inner surface portions defining at least a portion of the outlet fluid passageways and outlet outer surface portions opposite the outlet inner surface portions;

the outlet outer surface portions of the outlet fittings contacting the outlet header surface portions of the outlet header; and potting of the outlet header keeping the tubular membranes connected to the outlet fittings.

13. The tubular membrane heat exchanger of claim 12 wherein the inlet and outlet header bodies include outer surfaces;

wherein the inlet and outlet fittings are upstanding from the outer surfaces;

wherein the tubular membranes include end portions at the outer surfaces; and wherein the potting of the inlet and outlet headers embeds the outer surfaces of the inlet and outlet header bodies and the end portions of the tubular membranes.

14. The tubular membrane heat exchanger of claim 12 wherein the tubular membranes include side walls extending about the lumens; and wherein the inlet and outlet fittings extend into the lumens and engage the sidewall.

15. The tubular membrane heat exchanger of claim 12 wherein the tubular membranes include side walls of a material that is gas-permeable and liquid-impermeable.

16. The tubular membrane heat exchanger of claim 12 wherein the inlet and outlet header bodies include plate portions having the inlet and outlet through openings therein; and wherein the inlet and outlet fittings extend in the inlet and outlet through openings of the plate portions.

17. The tubular membrane heat exchanger of claim 16 wherein the tubular membranes do not extend into the through openings of the plate portions.

18. The tubular membrane heat exchanger apparatus of claim 12 further comprising a plurality of spacers along the tubular membranes that separate the tubular membranes.

19. The tubular membrane heat exchanger apparatus of claim 12 wherein the tubular membranes include end portions forming fluid-tight connections with the inlet and outlet fittings; and retainers securing the end portions of the tubular membranes to the inlet and outlet fittings.

20. The tubular membrane heat exchanger apparatus of claim 19 wherein the retainers are embedded in the potting of the inlet and outlet headers.

21. The tubular membrane heat exchanger apparatus of claim 12 wherein the inlet header body includes a curb extending about a periphery of the inlet header potting; and wherein the outlet header body includes a curb extending about a periphery of the outlet header potting.

22. The tubular membrane heat exchanger of claim 12 wherein the inlet through openings of the inlet header body each have a first inner diameter;

wherein the outlet through openings of the outlet header body each have a second inner diameter;

wherein the inlet fittings each include a first central axis and a first interference portion having a first maximum width transverse to the first central axis that is larger than the first inner diameter of the inlet through openings to inhibit pull-through of the inlet fittings from the inlet header body; and wherein the outlet fittings each include a second central axis and a second interference portion having a second maximum width transverse to the second central axis that is larger than the second inner diameter of the outlet through openings to inhibit pull-through of the outlet fittings from the outlet header body.

23. The tubular membrane heat exchanger of claim 12 wherein the inlet header surface portions and outlet header surface portions are tapered; and wherein the inlet outer surface portions of the inlet fittings and the outlet outer surface portions of the outlet fittings are tapered and engage the tapered inlet and outlet header surface portions to resist pull-through of the inlet and outlet fittings from the inlet and outlet headers.

\* \* \* \* \*